(12) United States Patent
Deng et al.

(10) Patent No.: US 12,314,149 B1
(45) Date of Patent: May 27, 2025

(54) COMPLEX DEVICE FAULT DIAGNOSIS METHOD AND SYSTEM BASED ON MULTI-DIMENSIONAL FEATURES

(71) Applicant: GUANGDONG UNIVERSITY OF TECHNOLOGY, Guangzhou (CN)

(72) Inventors: Yaohua Deng, Guangzhou (CN); Zilin Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/747,957

(22) Filed: Jun. 19, 2024

(30) Foreign Application Priority Data

Jan. 18, 2024 (CN) .......................... 202410072338.1

(51) Int. Cl.
  *G06F 11/22* (2006.01)
  *G06F 11/273* (2006.01)

(52) U.S. Cl.
  CPC ................. *G06F 11/2733* (2013.01)

(58) Field of Classification Search
  CPC . G06F 11/273; G06F 11/2257; G06F 11/2263
  See application file for complete search history.

(56) References Cited

U.S. PATENT DOCUMENTS

| | | | | |
|---|---|---|---|---|
| 5,469,463 | A * | 11/1995 | Polich | G06F 11/2257 706/916 |
| 10,452,971 | B2 * | 10/2019 | Chung | G06N 3/045 |
| 12,055,941 | B1 * | 8/2024 | Crego | G05D 1/0214 |
| 2017/0293543 | A1 * | 10/2017 | Xu | G06F 11/008 |

(Continued)

FOREIGN PATENT DOCUMENTS

| | | |
|---|---|---|
| CN | 116502135 A | 7/2023 |
| CN | 116521887 A | 8/2023 |

(Continued)

OTHER PUBLICATIONS

GTAD: Graph and Temporal Neural Network for Multivariate Time Series Anomaly Detection by Guan Entropy 2022, 24, 759. https://doi.org/10.3390/e24060759 (Year: 2022).*

Convolutional-Transformer Model with Long-Range Temporal Dependencies for Bearing Fault Diagnosis Using Vibration Signals by Ahmed Machines 2023, 11, 746. https://doi.org/10.3390/machines11070746 Jul. 17, 2023 (Year: 2023).*

(Continued)

*Primary Examiner* — Joseph O Schell

(57) ABSTRACT

Disclosed are a complex device fault diagnosis method and system based on multi-dimensional features, and the method comprises the following steps of: acquiring fault data of a target complex device, and carrying out input coding mapping and position coding; utilizing a multi-head attention mechanism and multi-head dilated convolution series connection, and acquiring fault features covering global and local deep information in combination with a feedforward neural network; fusing the extracted fault features to acquire a multi-dimensional feature vector; and acquiring a fault type probability score matrix by a classifier, and outputting a fault diagnosis result of the target complex device. The global modeling advantage of multi-head self-attention and the local multi-scale feature perception advantage of multi-head dilated convolution are fused, and a device fault diagnosis model in which a Transform model and the multi-head dilated convolution are mutually fused is established.

2 Claims, 4 Drawing Sheets

(56) References Cited

U.S. PATENT DOCUMENTS

| | | | | |
|---|---|---|---|---|
| 2021/0192333 | A1* | 6/2021 | Thiruvengadam | G06N 3/084 |
| 2022/0207321 | A1* | 6/2022 | Gulati | G10L 21/0272 |
| 2022/0414443 | A1* | 12/2022 | Li | G06F 9/5027 |
| 2023/0342175 | A1* | 10/2023 | Yang | G06F 3/0617 |
| 2024/0062361 | A1* | 2/2024 | Remillard | G06T 7/33 |
| 2024/0095495 | A1* | 3/2024 | Banino | G06N 3/006 |
| 2024/0404281 | A1* | 12/2024 | Ishihara | G06V 20/46 |
| 2025/0068954 | A1* | 2/2025 | Senior | G06F 11/0793 |

FOREIGN PATENT DOCUMENTS

| | | | |
|---|---|---|---|
| CN | 116735170 A | | 9/2023 |
| CN | 116933125 A | | 10/2023 |
| CN | 117034139 A | | 11/2023 |
| CN | 117294617 A | | 12/2023 |
| WO | WO-2024127315 A1 | * | 6/2024 |

OTHER PUBLICATIONS

Huang Hao, Deng Yaohua et al., "Research on Multi-Component Device Life Prediction Method under Cross-Working Conditions Based on Domain Feature Fusion Network", Journal of Electronic Measurement and Instrumentation, vol. 37, Issue 5, May 31, 2023, pp. 189-197.

Zhai, Pengbo; Yang, Hao; Song, Tingting; Yu, Kang; Ma, Longxiang; Huang, Xiangsheng., "Two-path semantic segmentation algorithm combining attention mechanism", Journal of Image and Graphics, Issue 08, Aug. 12, 2020, pp. 1627-1636.

* cited by examiner

COMPLEX DEVICE FAULT DIAGNOSIS METHOD AND SYSTEM BASED ON MULTI-DIMENSIONAL FEATURES

CROSS-REFERENCE TO RELATED APPLICATIONS

This application claims foreign priority of Chinese Patent Application No. 202410072338.1, filed on Jan. 18, 2024 in the China National Intellectual Property Administration, the disclosures of all of which are hereby incorporated by reference.

TECHNICAL FIELD

The present invention relates to the technical field of fault diagnosis, and particularly to a complex device fault diagnosis method and system based on multi-dimensional features.

BACKGROUND OF THE PRESENT INVENTION

With the development of science and technology, a component composition, a precision degree, an automation level and a control scale of a complex intelligent device are higher, operating conditions are more demanding, and presentation forms of faults or failures generated are complex and changeable, so that traditional maintenance methods can no longer meet the operation and maintenance needs of the complex device.

In recent years, with the development of sensor and Internet of Things technology, a mass of mechanical device condition monitoring data is stored, and more and more methods based on data driving are applied to fault diagnosis of the complex device. However, most of existing intelligent models are still insufficient in mining feature information, and it is difficult to identify valuable depth feature information, resulting in the low accuracy and high misjudgment rate of device fault diagnosis. Therefore, how to improve the quality and depth of data mining in the fault diagnosis of the complex device and obtain more valuable data features is one of the urgent problems to be solved.

SUMMARY OF THE PRESENT INVENTION

In order to solve the above technical problem, the present invention provides a complex device fault diagnosis method and system based on multi-dimensional features.

In a first aspect, the present invention provides a complex device fault diagnosis method based on multi-dimensional, which comprises the following steps of:
  acquiring fault data of a target complex device, preprocessing the fault data, and carrying out input coding mapping and position coding;
  utilizing a multi-head attention mechanism and multi-head dilated convolution series connection, and acquiring fault features covering global and local deep information in combination with a feedforward neural network;
  fusing the extracted fault features to acquire the multi-dimensional feature vector; and
  acquiring a fault type probability score matrix by using a classifier according to the multi-dimensional feature vector, and outputting a fault diagnosis result of the target complex device.

In the solution, the preprocessing the fault data, and carrying out the input coding mapping and the position coding, specifically comprises:
  acquiring the fault data X by using a sensor for sample preprocessing of normalization and slide window segmentation, reconstructing each part of sample data into a two-dimensional feature map $X^{2D}$ through an extended operation, segmenting the two-dimensional feature map $X^{2D}$ into a plurality of Patches through a convolution operation, and outputting a feature vector $X_{o1}$ after rearrangement; and
  constructing a learnable position coding matrix, and embedding the position coding matrix into the $X_{o1}$ in a form of addition for the position coding to obtain the $X_{o1}'$.

In the solution, the fault features are acquired through a feature extraction module, and the feature extraction module is in an end-to-end mode, and comprises a global feature extraction submodule, a local feature extraction submodule and a feedforward neural network submodule;
  $X_{o1}'$ obtained after the position coding is imported into the global feature extraction submodule, an attention score of each attention head is constructed and calculated by using the multi-head attention mechanism, and an output $X_{oh}$ of each attention head is obtained according to the attention score; and
  outputs of all attention heads are combined and spliced, and mapped through linear transformation to obtain a final multi-head self-attention output $X_{oH}$, and the $X_{oH}$ is subjected to layer standardization and then subjected to residual connection with the $X_{o1}'$ input to obtain a global feature $X_{o2}$ output.

In the solution, the local feature extraction submodule is composed of a multi-head dilated convolution and a linear mapping layer, specifically:
  the global feature $X_{o2}$ is input into the local feature extraction submodule, and the last dimension of the global feature $X_{o2}$ is segmented by using the multi-head mechanism, input into a multi-head multi-scale dilated convolution, and subjected to dilated convolutions with dilation rates of 1, 2 and 3 respectively; and
  feature matrices of three different scales of dilated convolution outputs are added with equal weights to obtain multi-head outputs, the multi-head outputs are combined and spliced, and subjected to linear mapping to obtain $X_{oH}^{d}$, and finally, layer normalization and residual connection are carried out to obtain a local feature $X_{o3}$ output by the local feature extraction submodule.

In the solution, the feedforward neural network submodule is composed of two fully connected layers and nonlinear activation, the local feature $X_{o3}$ is input into the feedforward neural network submodule for fully connected mapping and nonlinear transformation, and layer normalization and residual connection are carried out to obtain an output $X_{o4}$;

$$X_{o4} = LN(ReLU(X_{o3} \cdot W_1^F) \cdot W_2^F) + X_{o3}$$

wherein, $W_1^F$ and $W_2^F$ respectively represent weight parameters of the two fully connected layers, LN refers to normalization calculation, and ReLU refers to activation function calculation.

In the solution, the outputs $X_{o2}$, $X_{o3}$ and $X_{o4}$ of the global feature extraction submodule, the local feature extraction submodule and the feedforward neural network submodule are acquired in the feature extraction module, and skip residual connection between the output and the original input $X_{o1}'$ is added after each submodule to finally acquire an output $X_{o5}$ of the feature extraction module as the fault feature.

In the solution, the extracted fault features are fused to acquire the multi-dimensional feature vector;

the output $X_{o5}$ of the feature extraction module is input into a global average pooling layer, so as to fuse the fault features into a vector with a fixed length to acquire the multi-dimensional feature vector $\text{Output}_{GAP}$;

$$\text{Output}_{GAP} = \frac{1}{M^2} \sum_{i=1}^{D_{embed}} X_{o5}^i$$

wherein, $X_{o5}^i \in \mathbb{R}^{1 \times M^2}$ represents that an $i^{th}$ line of the $X_{o5}$ has a total of $M^2$ feature values, $M^2$ represents a sequence length, and $D_{embed}$ represents a feature dimension size.

In the solution, the acquiring the fault type probability score matrix by using the classifier, specifically comprises:

composing the classifier of two linear layers and a non-linear activation function, inputting the multi-dimensional feature vector output $\text{Output}_{GAP}$ obtained by fault feature fusion into the classifier, and transforming the multi-dimensional feature vector into the probability score matrix $\text{Output} \in \mathbb{R}^{1 \times N_{class}}$ of fault classification through the linear layer, wherein $N_{class}$ is a number of types.

In a second aspect, the present invention provides a complex device fault diagnosis system based on multi-dimensional features, which comprises an input coding and position coding module, a feature extraction module, a feature fusion module and a classifier module, wherein:

the input coding and position coding module is configured for preprocessing and pre-mapping fault data, copying the fault data into a two-dimensional feature map, segmenting the two-dimensional feature map to acquire a preset number of Patches, and carrying out position coding;

the feature extraction module is configured for globally and locally extracting fault feature information and in an end-to-end mode, and comprises a global feature extraction submodule, a local feature extraction submodule and a feedforward neural network submodule;

the feature fusion module is configured for fusing the fault features, and combing the fault features into a feature representation of global and local comprehensive information to acquire a multi-dimensional feature vector; and the classifier module is configured for outputting a fault type probability score matrix to realize fault diagnosis of a complex device.

Compared with the prior art, the present invention has the beneficial effects as follows:

in the solution, the global modeling advantage of multi-head self-attention and the local multi-scale feature perception advantage of multi-head dilated convolution are fused, and a device fault diagnosis model in which a Transform model and the multi-head dilated convolution are mutually fused is established, so that comprehensive extraction of global and local fault features is realized, valuable depth feature information is acquired, and accurate diagnosis of faults is realized; and the solution provides a network structure combining the multi-head mechanism and the multi-scale dilated convolution in parallel to extract a multi-scale fault value feature which has a hierarchical structure or is locally minor, the skip connection is added after the feature extraction module, the skip connection further strengthens an effect of original information, which is conductive to alleviating the problem of gradient disappearance in a deep neural network. Because the Transformer model is an end-to-end output network, the output of the feature extraction model is the multi-dimensional feature vector, and global average pooling is used for feature fusion after feature extraction to integrate sequence information with global and local deep features, which provides a new way for model output based on a Transformer architecture.

DESCRIPTION OF THE DRAWINGS

In order to illustrate the technical solutions in the embodiments or examples of the present invention more clearly, the drawings used in the descriptions of the embodiments or examples will be briefly introduced below. Obviously, the drawings in the following descriptions are merely some embodiments of the present invention. For those of ordinary skills in the art, other drawings may also be obtained based on these drawings without going through any creative work.

DETAILED DESCRIPTION OF PREFERRED EMBODIMENTS

In order to understand the above objects, features and advantages of present invention more clearly, the present invention is further described in detail hereinafter with reference to the drawings and specific embodiments. It should be noted that, in the case of no conflict, the embodiments of the present application and the features in the embodiments may be combined with each other.

Many specific details are explained in the following descriptions to facilitate fully understanding the present invention, but the present invention may also be implemented in other ways different from those described herein. Therefore, the scope of protection of the present invention is not limited by the specific embodiments disclosed hereinafter.

Figure 1:
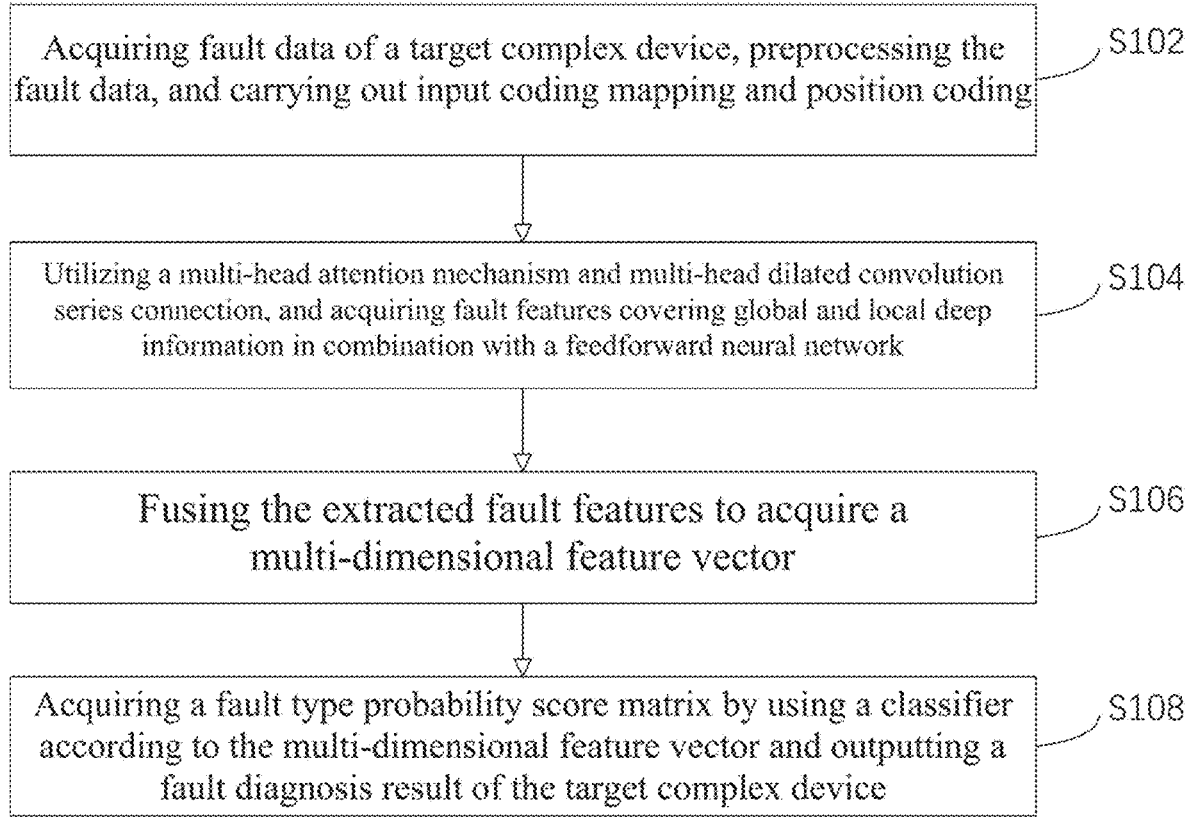
FIG. 1 is a flow chart of a complex device fault diagnosis method based on multi-dimensional features according to the present invention.
Figure 2:
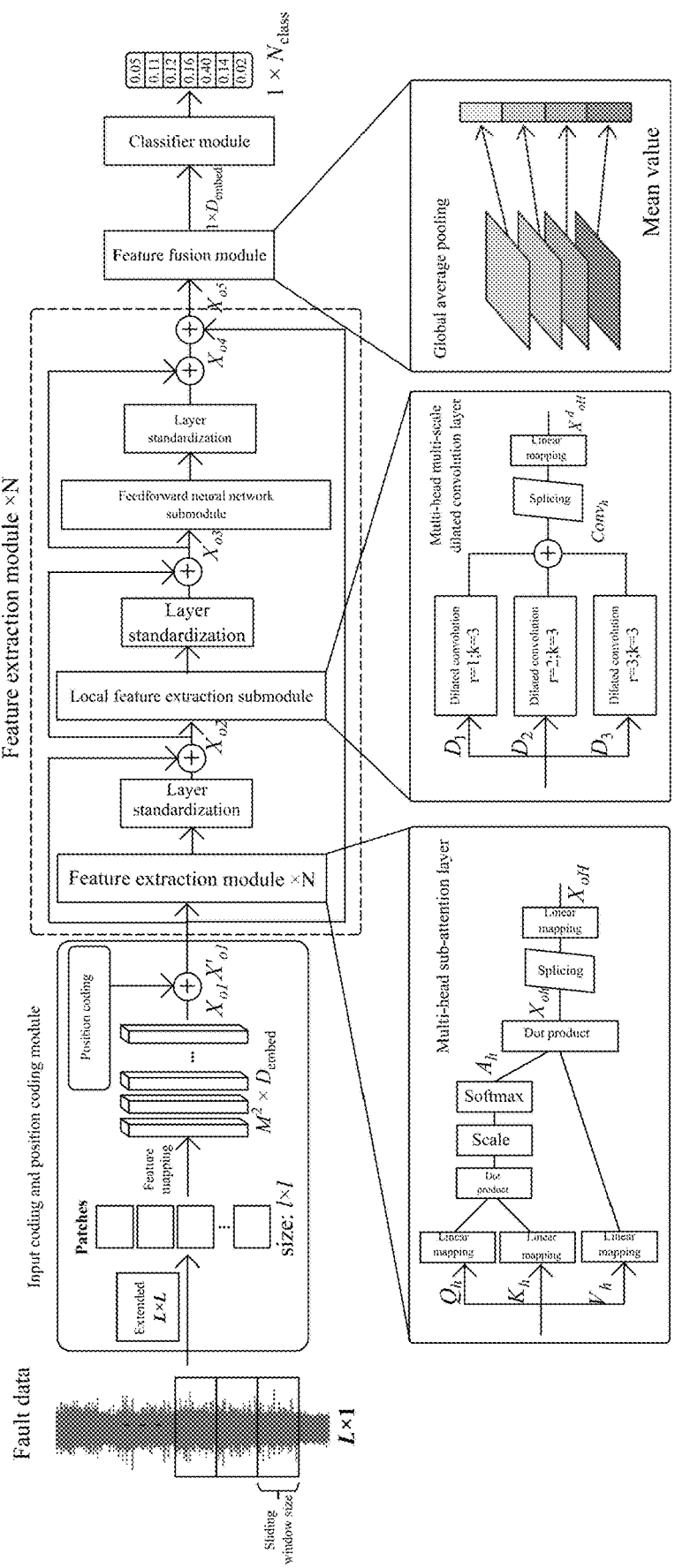
FIG. 2 is a schematic diagram of the complex device fault diagnosis method based on multi-dimensional features in an embodiment.

FIG. 1 and FIG. 2 show a flow chart and a schematic diagram of a complex device fault diagnosis method based on multi-dimensional features in an embodiment.

The embodiment provides a complex device fault diagnosis method based on multi-dimensional features, which comprises the following steps of:

S102: acquiring fault data of a target complex device, preprocessing the fault data, and carrying out input coding mapping and position coding;

S104: utilizing a multi-head attention mechanism and multi-head dilated convolution series connection, and acquiring fault features covering global and local deep information in combination with a feedforward neural network;

S106: fusing the extracted fault features to acquire a multi-dimensional feature vector; and S108: acquiring a fault type probability score matrix by using a classifier according to the multi-dimensional feature vector, and outputting a fault diagnosis result of the target complex device.

It should be noted that the fault data X are acquired by using a sensor for sample preprocessing of normalization and sliding window segmentation. Assuming that C is a feature dimension of input data (C=n in the case of n-dimensional data) and/is a sliding window size, that is, a data length (Lis set as a multiple of a number/of Patches), taking C=1 as an example, a size of the input data is set as $X \in \mathbb{R}^{L \times 1}$, and the input data are copied into a two-dimensional feature map $X^{2D} \in \mathbb{R}^{L \times L}$ through an extended operation, so as to extract two-dimensional feature information from the data. The two-dimensional feature map $X^{2D}$ is divided into $$M^2 = \frac{L}{l} \times \frac{L}{l}$$

Patches with the same size (the size of each Patch is l×l) by a convolution operation with a convolution kernel of l×l and a step length of l, a convolution input channel is C=1, and a convolution output channel is set as $D_{embed}$=512 (which may be modified according to different requirements). After a rearrangement operation, there is an output $X_{o1} \in \mathbb{R}^{M^2 \times D_{embed}}$. Because a model cannot identify original position information of the segmented Patches, a learnable position coding matrix (with the same size as the $X_{o1}$) is set, and the position coding matrix is embedded into the $X_{o1}$ in a form of addition to obtain $X_{o1}' \in \mathbb{R}^{M^2 \times D_{embed}}$ Traditional position coding generally depends on mathematical functions such as sine and cosine functions, and the model is more flexible in processing the fault data and extracting the position information by using the learnable position coding.

It should be noted that the fault features are acquired through a feature extraction module, and the feature extraction module is in an end-to-end mode, and comprises a global feature extraction submodule, a local feature extraction submodule and a feedforward neural network submodule. One layer standardization and one residual connection are embedded after each submodule, $X_{o1}' \in \mathbb{R}^{M^2 \times D_{embed}}$ obtained after the position coding is imported into the global feature extraction submodule, which is composed of multi-head self-attention mechanisms and used for extracting global feature information of each Patch. The last dimension $D_{embed}$ of the $X_{o1}$ input is segmented into h heads, three values are calculated through three linear layers respectively in each head, which are namely a query ($Q_h$), a key ($K_h$) and a value ($V_h$), and a number of heads h in hyper-parameters is an important parameter to be adjusted, which is generally a moderate value. $Q_h$ and $K_h$ are subjected to dot product multiplication to obtain a similarity score through similarity calculation, the similarity score is divided by a scaling factor $$\sqrt{d_k}\left(d_k = \frac{D_{embed}}{h}\right)$$

for a weight scaling operation to make network training more stable, and then an Attention score $A_h$ is obtained through Softmax, and subjected to dot product multiplication with $V_h$ to obtain an output $X_{oh}$:

$$X_{oh} = \text{softmax}\left(\frac{Q_h K_h^T}{\sqrt{d_k}}\right) \cdot V_h$$

wherein, $d_k$ represents a dimension of the query (or the key), and T refers to a transposition operation.

Outputs of all attention heads are combined and spliced, and mapped through linear transformation to obtain a final multi-head self-attention output $X_{oH} \in \mathbb{R}^{M^2 \times D_{embed}}$, and the final multi-head self-attention output $X_{oH} \in \mathbb{R}^{M^2 \times D_{embed}}$ enters the next layer of system, that is, the layer standardization, which refers to normalizing all neurons in an intermediate layer:

$$z^{(l)} = \frac{z^{(l)} - \mu^{(l)}}{\sqrt{\sigma^{(l)} + \epsilon}} \odot \gamma + \beta \Leftarrow LN_{\gamma,\beta}(z^{(l)})$$

wherein, $z^{(l)}$ represents a net input of an $l^{th}$ layer of nerve, $\mu_{(l)}$ and $\sigma_{(l)}$ represent a mean and a variance, $\gamma$ and $\beta$ represent parameter vectors of scaling and translation, with the same number of dimensions as the $z^{(l)}$, $\epsilon$ is intended to prevent the variance from being 0 to cause invalid calculation, and LN refers to normalized calculation.

The $X_{oH}$ is subjected to layer standardization and then subjected to residual connection with the $X_{o1}'$ input to obtain a global feature $X_{o2}$ output. The residual connection is repeatedly applied in the model to enable each layer to retain original input information, which is conductive to the training stability and gradient propagation of the model, so as to make the training of a deep network more stable.

It should be noted that the local feature extraction submodule is composed of a multi-head dilated convolution and a linear mapping layer, and aims to extract a locally minor fault feature which has a hierarchical structure or multiple scales. The global feature $X_{o2}$ is input into the local feature extraction submodule, the last dimension of the global feature $X_{o2}$ is segmented into h parts by using the multi-head mechanism to obtain three vectors $D_1$, $D_2$, $D_3 \in \mathbb{R}^{M^2 \times d_k'}$, wherein $$d_k' = \frac{D_{embed}}{h},$$

the three vectors are input into a multi-head multi-scale dilated convolution, and subjected to dilated convolutions with dilation rates of 1, 2 and 3 respectively, and then feature matrices output by the three different scales of dilated convolutions are added with equal weights to obtain multi-head outputs, which are namely $\text{Conv}_1, \text{Conv}_2, \ldots, \text{Conv}_h$, and calculated as follows:

$\text{Conv}_h = \text{DilatedConv2d}_{k=3,r=1}(D_1, W_{h,1}) + \text{DilatedConv2d}_{k=3,r=2}(D_2, W_{h,2}) + \text{DilatedConv2d}_{k=3,r=3}(D_3, W_{h,3})$ wherein, $\text{Conv}_h$ represents an output of an $h^{th}$ head subjected to the multi-scale dilated convolution, DilatedConv2d(·) represents a two-dimensional dilated convolution operation, k represents a convolution kernel size, r represents a dilation rate, and $W_{hi}$ is a parameter of an $i^{th}$ convolution kernel in the $h^{th}$ head.

The multi-head outputs are combined and spliced, and subjected to linear mapping to obtain $X_{oH}{}^d$, and finally, layer normalization and residual connection are carried out to obtain a local feature $X_{o3} \in \mathbb{R}^{M^2 \times D_{embed}}$ output by the local feature extraction submodule.

It should be noted that the feedforward neural network submodule is composed of two fully connected layers and nonlinear activation. Because matrix multiplication, that is, linear transformation, is mainly carried out in a multi-head self-attention layer, and a nonlinear feature expression ability is insufficient, a fully connected feedforward neural network layer is used for fully connected mapping and nonlinear transformation of the feature vector to improve the network expression ability, so as to learn more abstract features. The local feature $X_{o3}$ is input into the feedforward neural network submodule for fully connected mapping and nonlinear transformation, and layer normalization and residual connection are carried out to obtain an output $X_{o4} \in \mathbb{R}^{M^2 \times D_{embed}}$;

$$X_{o4} = LN(\text{ReLU}(X_{o3} \cdot W_1{}^F) \cdot W_2{}^F) + X_{o3}$$

wherein, $W_1{}^F$ and $W_2{}^F$ respectively represent weight parameters of the two fully connected layers, LN refers to normalization calculation, and ReLU refers to activation function calculation.

It should be noted that, in order to further avoid the problems of gradient disappearance and information loss in a transmission process of network parameters, the outputs $X_{o2}$, $X_{o3}$ and $X_{o4}$ of the global feature extraction submodule, the local feature extraction submodule and the feedforward neural network submodule are acquired in the feature extraction module, and skip residual connection between the output and the original input $X_{o1}{}'$ is added after each submodule to finally acquire an output $X_{o5} \in \mathbb{R}^{M^2 \times D_{embed}}$ of the feature extraction module as the fault feature.

Figure 3:
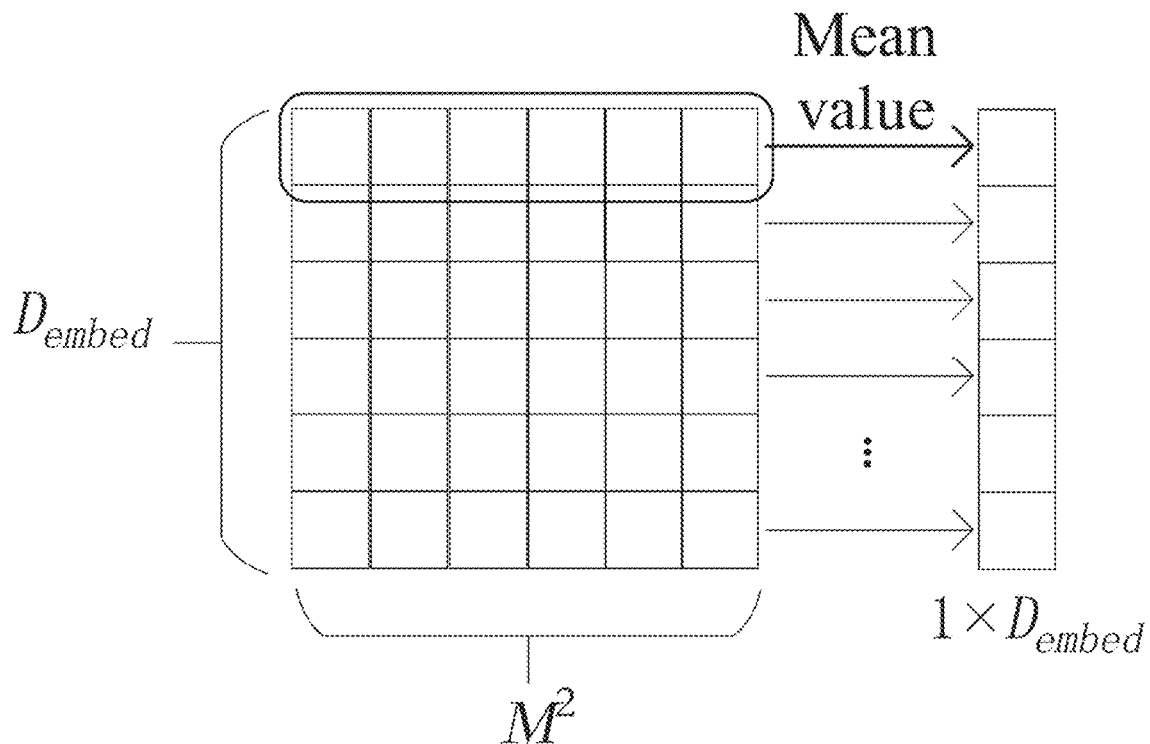
FIG. 3 is a schematic diagram of fault feature fusion in the embodiment.

It should be noted that global average pooling is executed on a sequence dimension, and as shown in FIG. 3, a feature vector in which each position feature is fused is output, that is, $\text{Output}_{GAP}$ 531 $\mathbb{R}^{M^2 \times D_{embed}}$, so as to fuse fault feature information of the whole sequence into a vector with a fixed length to prepare for subsequent model output. The output $X_{o5} \in \mathbb{R}^{M^2 \times D_{embed}}$ of the feature extraction module is input into a global average pooling layer, so as to fuse the fault features into a vector with a fixed length to acquire the multi-dimensional feature vector $\text{Output}_{GAP}$;

$$\text{Output}_{GAP} = \frac{1}{M^2} \sum_{i=1}^{D_{embed}} X_{o5}^i$$

wherein, $X_{o5}{}^i \in \mathbb{R}^{1 \times M^2}$ represents that an $i^{th}$ line of the $X_{o5}$ has a total of $M^2$ feature values, $M^2$ represents a sequence length, and $D_{embed}$ represents a feature dimension size.

It should be noted that the classifier is composed of two linear layers and a nonlinear activation function, the multi-dimensional feature vector output $\text{Output}_{GAP}$ obtained by fault feature fusion is input into the classifier, and the multi-dimensional feature vector is transformed into the probability score matrix $\text{Output} \in \mathbb{R}^{1 \times N_{class}}$ of fault classification through the linear layer, wherein $N_{class}$ is a number of types, so that a task of fault diagnosis and classification is realized.

According to the embodiment of the present invention, historical fault data of the complex device are acquired, the historical fault data are clustered by using a K-means algorithm, a position feature of the historical fault data is extracted in the clustering process, components corresponding to the complex device are acquired based on the position feature, a high-frequency fault category of the components is acquired by using a big data method, a clustering cluster is weighted by using a frequency corresponding to the high-frequency fault category, a cluster feature of the cluster in a clustering result is extracted, and a category label is set according to the cluster feature. According to a distribution similarity of the cluster feature, a coupling degree of a component corresponding to a fault and occurrence time of the fault, a degree of association between different clusters is acquired, the cluster is used as a node, the degree of association is used as an edge structure to graphically represent the clustering result to acquire a corresponding adjacency matrix, a graph neural network is introduced to learn the graph representation, the cluster nodes are aggregated and updated according to the adjacency matrix, and an inner product of nodes is calculated through the updated cluster nodes as a fault association rule among various cluster nodes. After a current fault diagnosis result of the complex device is acquired, the fault category and a neighbor component coupled with the fault component are extracted, a high-association fault of the fault category is acquired by using the fault association rule, and whether the high-frequency fault corresponding to the neighbor component intersects with the high-association fault is judged, and if the high-frequency fault corresponding to the neighbor component intersects with the high-association fault, a fault early warning of the neighbor component is generated according to the fault category in the intersection for preventive operation and maintenance.

Figure 4:
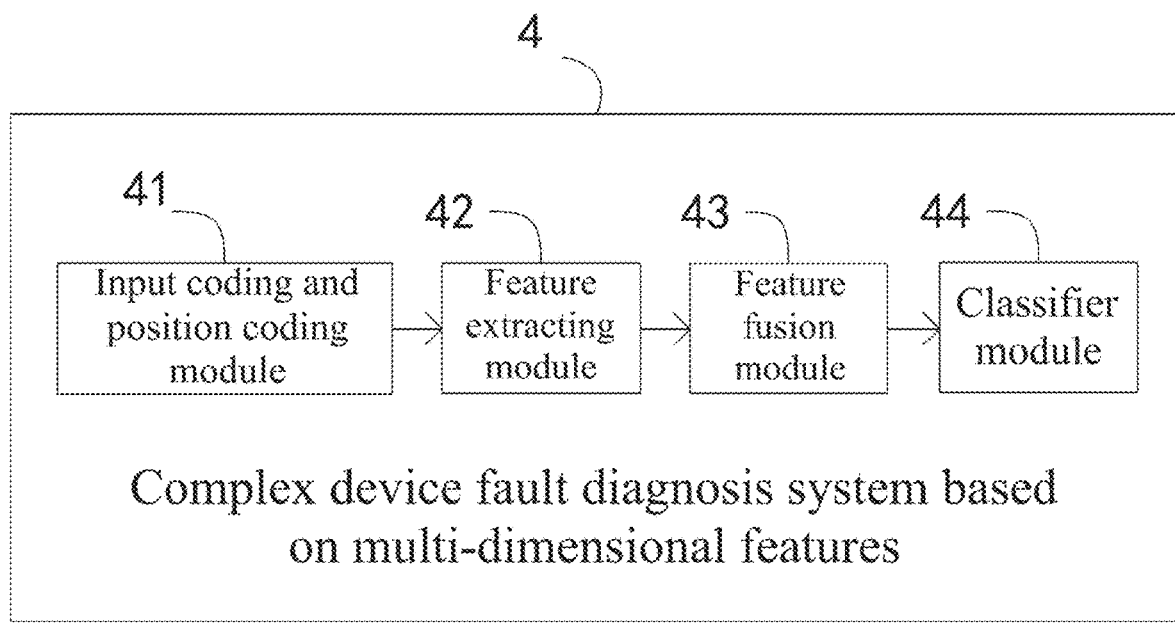
FIG. 4 is a block diagram of a complex device fault diagnosis system based on multi-dimensional features in the embodiment.

FIG. 4 is a block diagram of a complex device fault diagnosis system based on multi-dimensional features in the embodiment.

The embodiment provides a complex device fault diagnosis system 4 based on multi-dimensional features, which comprises an input coding and position coding module 41, a feature extraction module 42, a feature fusion module 43 and a classifier module 44.

The input coding and position coding module 41 is configured for preprocessing and pre-mapping fault data, copying the fault data into a two-dimensional feature map, segmenting the two-dimensional feature map to acquire a preset number of Patches, and carrying out position coding.

The feature extraction module 42 is configured for globally and locally extracting fault feature information and in an end-to-end mode, and comprises a global feature extraction submodule, a local feature extraction submodule and a feedforward neural network submodule.

The feature fusion module 43 is configured for fusing the fault features, and combing the fault features into a feature representation of global and local comprehensive information to acquire a multi-dimensional feature vector.

The classifier module 44 is configured for outputting a fault type probability score matrix to realize fault diagnosis of a complex device.

Figure 5:
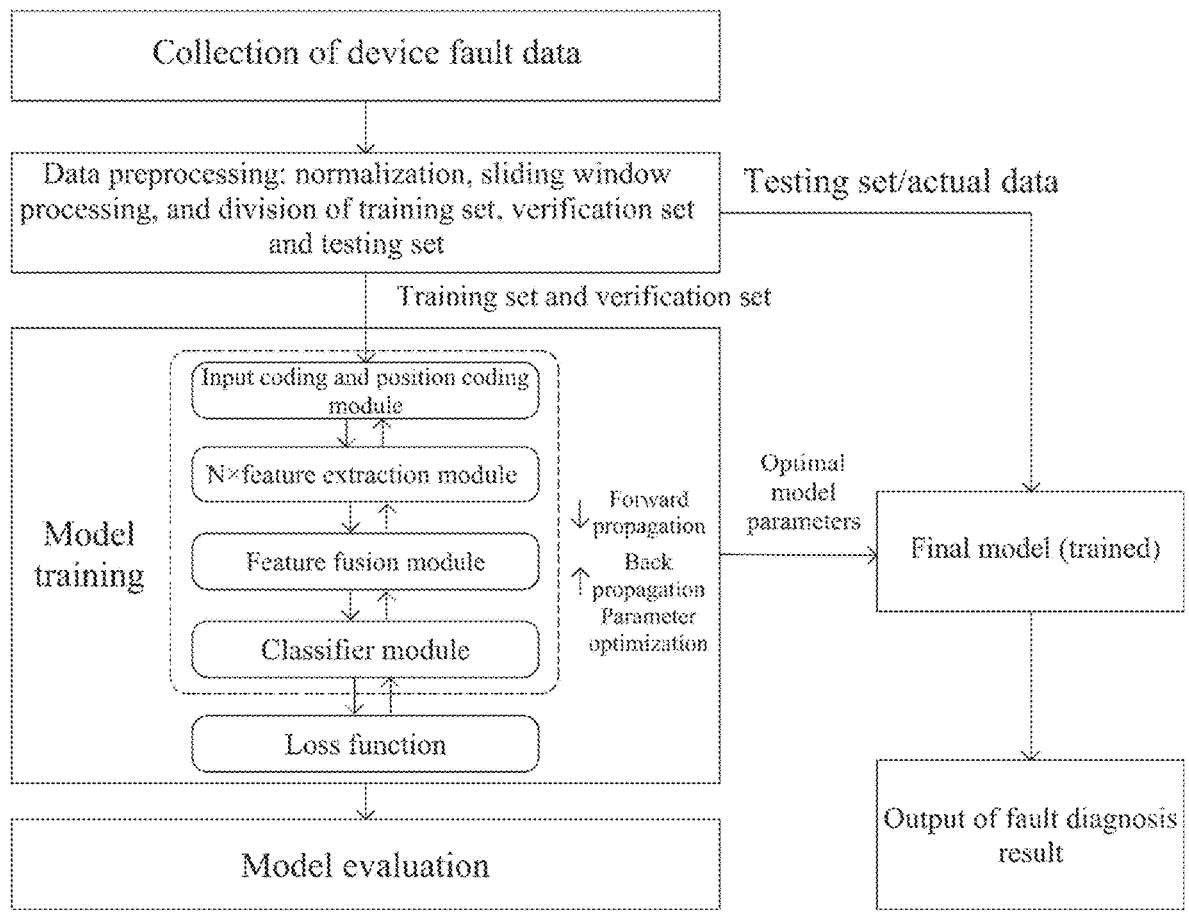
FIG. 5 is a flow chart of fault diagnosis by a fault diagnosis model in the embodiment.

FIG. 5 is a flow chart of fault diagnosis by a fault diagnosis model in the embodiment.

In the system of the embodiment, the global modeling advantage of multi-head self-attention and the local multi-scale feature perception advantage of multi-head dilated convolution are fused, and a device fault diagnosis model in which a Transform model and the multi-head dilated convolution are mutually fused is established. The training, evaluation and testing of the fault diagnosis model are specifically as follows.

Collection of device fault data: the device fault data are acquired by using a sensor, which may be vibration, pressure or temperature data, so as to ensure data integrity and availability.

Data preprocessing: the fault data are mostly time-sequence data, and in order to make a model achieve a better and more stable effect, original data are standardized first, and the data are segmented into multiple training, verification and testing samples by a sliding window method.

Model training: the preprocessed fault data are input into the fault diagnosis model, and enter the input coding and position coding module to be preprocessed and pre-mapped before entering the model to obtain $X_{o1}'$, then the $X_{o1}'$ is input into the feature extraction module to extract fault features covering global and local deep information in the data, $X_{o5}$ is obtained after the fault feature passes through N feature extraction modules, then the $X_{o5}$ enters the feature fusion module and the classifier module to finally obtain an output Output$\in \mathbb{R}^{1 \times N_{class}}$. Parameter optimization is carried out in the training through the back propagation of classification loss to obtain optimal network model parameters. A loss function is a cross entropy loss function, and the function can effectively update the model parameters in a right direction in a process of gradient back propagation, so as to improve the accuracy and convergence speed of the model.

Model evaluation: in the process of model training, in order to test the validity and robustness of the model, an accuracy, a precision, a recall rate and an F1 score are introduced as evaluation indexes of the model to comprehensively evaluate a model performance.

Model testing: the fault data in a test set or an actual task are input into the model with the optimal network parameters, and a diagnosis result is output, so that a fault diagnosis task is realized.

In several embodiments provided by the present application, it should be understood that the disclosed system and method may be implemented in other ways. The foregoing apparatus embodiments are only illustrative. For example, the division of the units is only one logical function division. In practice, there may be other division methods. For example, multiple units or assemblies may be combined or integrated into another system, or some features may be ignored or not executed. In addition, the illustrated or discussed mutual coupling or direct coupling or communication connection between various components may be indirect coupling or communication connection through some interfaces, devices or units, and may be in electrical, mechanical or other forms.

The units illustrated as separated parts above may be or may not be physically separated, and the parts displayed as the units may be or not be physical units, which means that the parts may be located in one place or distributed on multiple network units. Some or all of the units may be selected according to actual needs to achieve the purpose of the solution of the embodiment.

In addition, the functional units in the embodiments of the present invention may be wholly integrated in one processing unit, or the units may respectively serve as one unit separately, or two or more units may be integrated in one unit. The integrated units above may be implemented in a form of hardware, or in a form of hardware plus a software functional unit.

Those of ordinary skills in the art may understand that all or partial steps for realizing the above method embodiments may be completed by instructing related hardware through a program, the above program may be stored in a computer-readable storage medium, and the program executes the steps of the above method embodiments when executed. Moreover, the above storage medium comprises a portable storage device, a Read-Only Memory (ROM), a Random Access Memory (RAM), a magnetic disk, an optical disk, or other media, which may store program codes.

Alternatively, the above integrated unit of the present invention may also be stored in a computer-readable storage medium when being implemented in a form of a software functional module and sold or used as an independent product. Based on such understanding, the essence of the technical solutions in the embodiments of the present invention or the part contributing to the prior art may be embodied in a form of a software product. The computer software product is stored in a storage medium including a number of instructions such that a computer device (which may be a personal computer, a server, a network device, or the like) executes all or a part of the method in the embodiments of the present invention. The foregoing storage medium comprises: any medium capable of storing program codes such as a portable storage device, a ROM, a RAM, a magnetic disk, an optical disk, or the like.

The above are merely the specific embodiments of the present invention, but the scope of protection of the present invention is not limited to the specific embodiments. Those skilled in the art may easily think of changes or substitutions within the technical scope disclosed by the present invention, and all the changes or substitutions should be included in the scope of protection of the present invention. Therefore, the scope of protection of the present invention should be subject to the claims.

We claim:

1. A complex device fault diagnosis method based on multi-dimensional features, comprising the following steps of:
   acquiring fault data X of a target complex device, pre-processing the fault data X, and carrying out input coding mapping and position coding;
   acquiring fault features covering global and local deep information in combination with a feedforward neural network;
   fusing the fault features to acquire a multi-dimensional feature vector; and
   acquiring a fault type probability score matrix according to the multi-dimensional feature vector, and outputting a fault diagnosis result of the target complex device;
   wherein, an input $X_{o1}'$ is obtained after the position coding is imported, an attention score of each of multiple attention heads is constructed and calculated, and an output $X_{oh}$ of each of the multiple attention heads is obtained according to the attention score; and
   outputs of the multiple attention heads are combined and spliced, and mapped through linear transformation to obtain a final multi-head self-attention output $X_{oH}$, and the final multi-head self-attention output $X_{oH}$ is subjected to layer standardization and then subjected to residual connection with the input $X_{o1}'$ to obtain a global feature $X_{o2}$ output;
   wherein, the global feature $X_{o2}$ is input, and a last dimension of the global feature $X_{o2}$ is segmented, and subjected to dilated convolutions with dilation rates of 1, 2 and 3 respectively; and feature matrices of three different scales of dilated convolution outputs are added with equal weights to obtain multi-head outputs, the multi-head outputs are combined and spliced, and subjected to linear mapping to obtain $X_{oH}^{d}$, and finally, layer normalization and residual connection are carried out to obtain a local feature $X_{o3}$ output;

the local feature $X_{o3}$ is input for fully connected mapping and nonlinear transformation, and layer normalization and residual connection are carried out to obtain an output $X_{o4}$;

$$X_{o4}=LN(\text{ReLU}(X_{o3} \cdot W_1^F) \cdot W_2^F)+X_{o3};$$

wherein, $W_1^F$ and $W_2^F$ respectively represent weight parameters of the two fully connected layers, LN refers to normalization calculation, and ReLU refers to activation function calculation; and the outputs $X_{o2}$, $X_{o3}$ and $X_{o4}$ are acquired, and skip residual connection between the output and the input $X_{o1}'$ is added to finally acquire an output $X_{o5}$ as the fault features; and the fault features are fused to acquire the multi-dimensional feature vector;

the output $X_{o5}$ is input, so as to fuse the fault features into a vector with a fixed length to acquire the multi-dimensional feature vector $\text{Output}_{GAP}$;

$$\text{Output}_{GAP} = \frac{1}{M^2}\sum_{i=1}^{D_{embed}} X_{o5}^i;$$

wherein, $X_{o5}^i \in \mathbb{R}^{1 \times M^2}$ represents that an $i^{th}$ line of the $X_{o5}$ has a total of $M^2$ feature values, $M^2$ represents a sequence length, and $D_{embed}$ represents a feature dimension size.

2. The complex device fault diagnosis method based on multi-dimensional features according to claim 1, wherein the preprocessing the fault data X, and carrying out the input coding mapping and the position coding, specifically comprises:

acquiring the fault data X by using a sensor for sample preprocessing of normalization and slide window segmentation, reconstructing each of multiple parts of sample data into a two-dimensional feature map $X^{2D}$ through an extended operation, segmenting the two-dimensional feature map $X^{2D}$ into a plurality of patches through a convolution operation, and outputting a feature vector $X_{o1}$ after rearrangement; and constructing a learnable position coding matrix, and embedding the position coding matrix into the feature vector $X_{o1}$ in a form of addition for the position coding to obtain the input $X_{o1}'$.

* * * * *